United States Patent [19]

Thomas, III

[11] 4,196,852

[45] Apr. 8, 1980

[54] COMPRESSED AIR TEST SAMPLE PREPARING AND SPRAYING APPARATUS

[75] Inventor: James M. Thomas, III, Greenville, Miss.

[73] Assignee: Ciba-Geigy Corporation, Ardsley, N.Y.

[21] Appl. No.: 904,916

[22] Filed: May 3, 1978

[51] Int. Cl.² ............................................. A01G 25/09
[52] U.S. Cl. ................................... 239/113; 239/148; 239/159
[58] Field of Search ....................... 222/135, 136, 250; 239/112, 113, 146, 148, 159, 170, 172

[56] References Cited

U.S. PATENT DOCUMENTS

| | | | |
|---|---|---|---|
| 2,210,934 | 8/1940 | Gleason | 239/172 X |
| 3,348,737 | 10/1967 | Yingst et al. | 222/133 X |
| 3,722,819 | 3/1973 | Hall et al. | 239/322 X |
| 3,804,300 | 4/1974 | Cox | 222/135 X |
| 3,926,371 | 12/1975 | Harrell et al. | 239/159 X |
| 3,940,063 | 2/1976 | Baumgartner et al. | 239/112 X |
| 3,976,087 | 8/1976 | Bolton et al. | 239/148 X |

*Primary Examiner*—John J. Love
*Attorney, Agent, or Firm*—Wenderoth, Lind & Ponack

[57] ABSTRACT

A measuring, mixing and spraying apparatus for a tractor is a combination of, generally, four distinct component parts. The entire apparatus is operated under pressure from a compressor mounted onto the front of the tractor. Along one side of the tractor is a diluent storage tank which provides storage on the tractor for the diluent used to dilute a test sample being sprayed. Connected to the storage tank is a diluent measuring tank specifically designed to receive a predetermined amount of diluent from the diluent storage tank. The diluent measuring tank is connected to a diluent mixing tank, and in this mixing tank the measured amount of diluent from the diluent measuring tank is mixed with a specific quantity of the test sample. The diluent mixing tank in turn, leads to a spray boom which disperses the diluted and mixed test sample.

10 Claims, 1 Drawing Figure

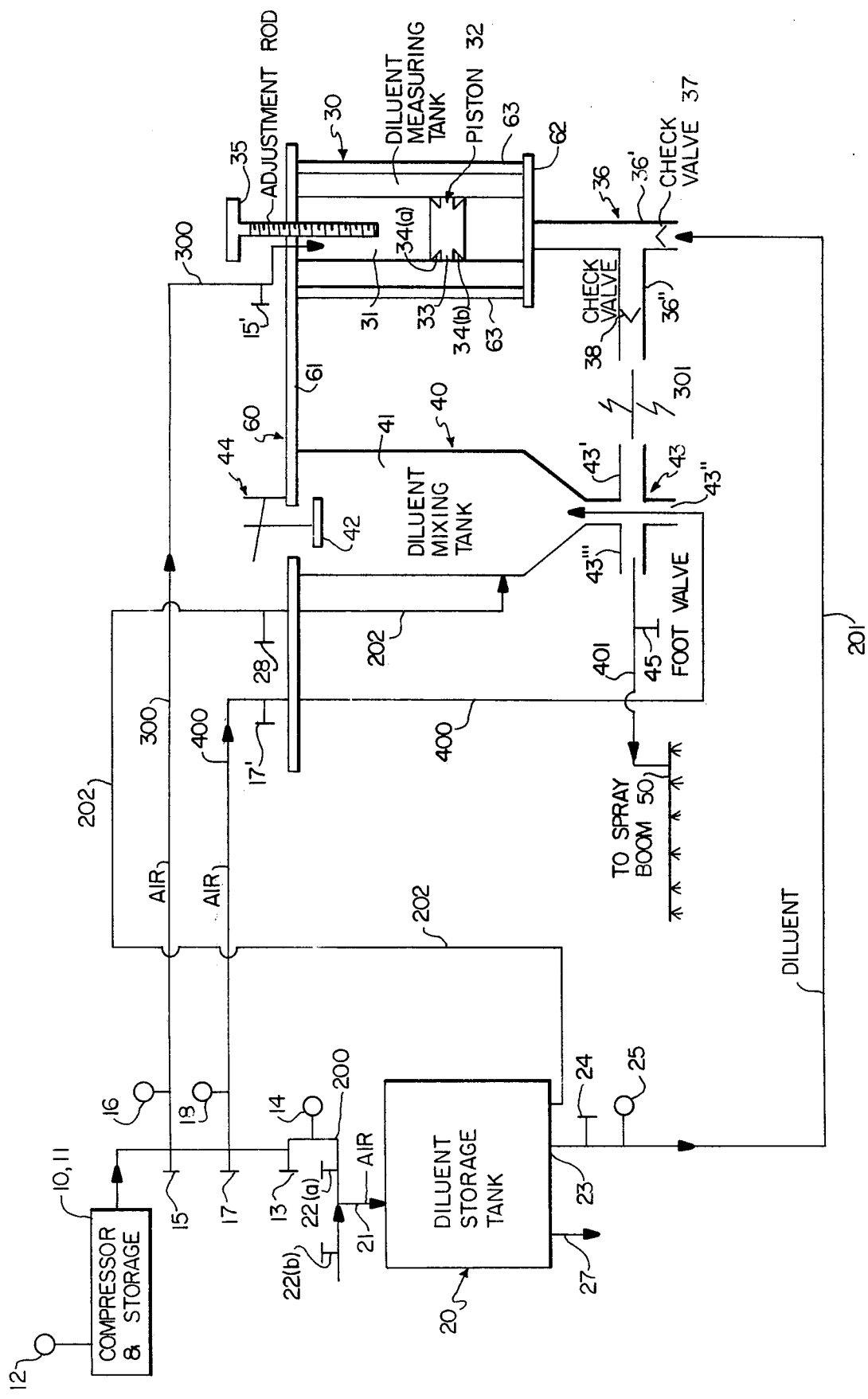

COMPRESSED AIR TEST SAMPLE PREPARING AND SPRAYING APPARATUS

The present invention relates to a spraying device for use on a tractor, and more particularly to a spray device which can easily prepare and deliver sprays of differing concentrations in the field without any premixing before entering the filed.

BACKGROUND OF THE INVENTION

During the research and development of herbicides and pesticides, it is often necessary to conduct multiple tests of the newly developed products at varying concentrations to determine the optimum effectiveness of each product concentration. In a laboratory, preparation of quantities in varying concentrations is not difficult with equipment being close at hand, but oftentimes handling and transporting the various samples at different concentrations to the test-site is inconvienent and cumbersome. Onsite preparation of the various concentrations, especially if the product is to be tested in an open field, usually requires preliminarily preparing the individual samples and then transfering the individual samples to the required application device. Furthermore, this is usually a manual process of measuring and mixing that can be time consuming and difficult in the field.

SUMMARY OF THE INVENTION

In order to overcome the problems which currently exist in the field of preparing and dispersing quanties of test samples of various concentrations in test programs, the present invention provides an apparatus which is capable of easily and efficiently preparing and subsequently spraying any number of different test concentrations at the actual test location.

It is a primary object of this invention to overcome the measuring, mixing and transporting inconveniences inherent in the established methods of preparing and dispersing test samples by the presently available methods and to provide a self-contained system that can be easily used to both mix the samples in predetermined concentrations and also spray the samples onto test specimens.

These objectives are achieved in an apparatus which is a combination of, generally, four distinct component parts. To operate the entire system under pressure, a compressor is mounted onto the front of a tractor. Along one side of the tractor is a diluent storage tank which provides storage on the tractor for the diluent used to dilute a test sample being sprayed. Connected to the storage tank is a diluent measuring tank specifically designed to receive a predetermined amount of diluent from the diluent storage tank. The diluent measuring tank is connected to a diluent mixing tank, and in this mixing tank the measured amount of diluent from the diluent measuring tank is mixed with a specific quantity of the test sample. The diluent mixing tank, in turn, leads to a spray boom which disperses the diluted and mixed test sample.

BRIEF DESCRIPTION OF THE DRAWING

Further objects and features of the invention will be apparent from the following description, taken with the accompanying drawing, wherein:

The single FIGURE is a schematic drawing of the layout of the elements of the present invention.

DETAILED DESCRIPTION OF THE INVENTION

The apparatus of the present invention is designed to be totally contained on a tractor or any other suitable agricultural vehicle. The invention is especially useful in situations where many sample concentrations must be applied to various portions of test plots. By using this invention, various samples of fertilizers, herbicides, pesticides and the like can be diluted without leaving the tractor to prepare the various dilute solutions.

A compressor 10 is mounted on the front of a tractor and is designed to operate from the tractor engine. The compressor has a compressed air storage tank 11 which is designed to store air therein under pressure. Generally, the air pressure within the storage tank 11 is maintained between 90 and 110 psi. An air pressure gauge 12 is provided to monitor the air pressure within the storage tank.

From the compressed air storage tank, air pressure lines 200, 300, and 400 supply compressed air to a diluent storage tank 20, a diluent measuring tank 30, and a diluent mixing tank 40 respectively. The amount of compressed air to each tank is controlled by individual regulators in each of the air pressure lines, and an air pressure gauge in each line monitors the air pressure therein. Regulator 13 and gauge 14 control line 200; regulator 15 and gauge 16 control line 300; and regulator 17 and gauge 18 control line 400. Each air pressure line is preferably flexible hosing such as plastic tubing, though any form of tubing will suffice.

Compressed air passing through the regulator 13 and air line 200 enters the diluent storage tank 20 at the top thereof through an inlet 21. Separate valves 22(a) and 22(b) are also connected to the inlet 21. Valve 22(a) controls the flow of compressed air into the tank 20 from the compressor, while the valve 22(b) may be used to bleed air from the tank to the atmosphere. Diluent under pressure is withdrawn from the storage tank 20 through an outlet 23 at the base of the tank 20 and is forced through a diluent flow line 201 under pressure to the diluent measuring tank 30. The flow rate and pressure of the diluent through this flow line 201 are controlled by a regulator 24 positioned in that line. An additional pressure gauge 25 is provided in the diluent flow line 201 for measuring the pressure therein.

In a preferred embodiment for the present invention, the diluent storage tank 20 is a thirteen gallon metal water storage tank attached to the left side of the tractor. The flow lines 201, 202 are also of flexible tubing such as rubber or plastic tubing.

A support framework 60 is installed on the side of the tractor in order to mount the diluent measuring tank 30 and the diluent mixing tank 40 thereon. The framework 60 also provides a location for additional control valves 15', 17' in air lines 300 and 400 and a control valve 28 in a clean out diluent supply line 202 from the diluent storage tank 20 to the diluent mixing tank 40. Forming the top 61 of the framework 60 is a flat metal plate, and the control valves 15', 17' and 28 are mounted on this plate 61.

At one end of the top plate 61 is the diluent measuring tank 30. The body of the measuring tank 30 is a hollow cylinder 31 which is preferably of transparent plastic, such as Plexiglass and is 3"×12" (7.6 cm×30.5 cm). A bottom plate 62 acts as a bottom for this hollow cylinder 31, and four threaded rods 63 connect the bottom plate 62 and the top plate 61 and hold the hollow cylinder 31 securely sealed thereinbetween.

Inside the cylinder 31 is a freely movable piston 32. This piston is a block 33 approximately 2" (5.1 cm) thick which has two Molythane hydraulic jack cups 34(a), 34(b) attached to each side thereof in order to form a seal. From this construction, it is possible to have a freely floating piston which is completely sealed within the cylinder 31.

Even though the piston 32 is freely movable, it is possible to regulate the vertical movement of the piston by means of an adjustment rod 35 fitted through the top plate 61 into the cylinder. By regulating the vertical positioning of the piston, it is possible to control the upper limit of the piston movement and thereby determine the amount of diluent which will fill the diluent measuring tank. A specific, measured volume of diluent is then obtained. In the preferred embodiment, the adjustment rod is a simple, threaded T-shaped rod threaded through the top plate 61 and may be rotated clockwise or counterclockwise to raise and lower it.

The diluent flowing from the diluent storage tank 20 through the diluent flow line 201 passes through a T-connection 36 connected through the bottom plate 62 before entering the hollow cylinder 31. This T-connection 36 has a check valve 37 in the inlet side 36' thereof and a check valve 38 in the outlet side 36". The purpose of these check valves is primarily to prohibit the diluent from flowing backward once it has passed therethrough.

Next to the diluent measuring tank 30 on the underneath side of the top plate 61 is the diluent mixing tank 40. Like the measuring tank, the top of the mixing tank is formed by the top plate 61. The mixing tank itself is a cylindrical tank 41 with a conical bottom portion. There is a lid 42 formed in the top plate 61 to allow access into the cylindrical tank 41 therebeneath. A handle mechanism 44 is mounted on the top of the plate 61 and is connected to the lid 42 for opening the lid. The cylindrical tank and its conical bottom portion are preferably made of stainless steel so that they will not be readily harmed by the substances mixed therein.

The bottom of the conical portion of the tank is connected to a crosspiece 43 which has two inlet sides 43', 43" and an outlet side 43'". The inlet side 43' is connected by means of flow tubing 301 to the outlet side 36" of the T-connection at the bottom of the measuring tank 30. The diluent flows from the measuring tank 30, through the outlet side of the T-connection, and through the flow tubing 301 into the crosspiece at 43' and into the mixing tank 40. Any backflow in the flow tubing 301 is prevented by the check valve 38.

The air line 400 is connected through the second inlet side 43" of the crosspiece 43 and extends upward into the mixing tank 40 to supply pressurized air from the compressed storage tank 11 into the mixing tank. The flow of compressed air through line 400 is controlled by regulator 17, and the pressure is displayed on the pressure gauge 18.

Mounted on the top plate 61 is a vented ball valve 17' in the air line 400. While the first regulator 17 controls the pressure in the line 400, the ball valve 17' actually controls the flow of air in the line through the inlet 43" of the crosspiece 43.

The only outlet 43'" of the crosspiece 43 is connected to a flow line 401 which connects the boom 50 and the diluent mixing tank so that the contents of the mixing tank can be sprayed. In this flow line 401 is the valve 45, preferably a foot operated valve mounted on the tractor which controls the flow through the line 401. When the lid 42 is closed on the diluent mixing tank 41 and valve 17' opened to allow compressed air into the mixing tank, the compressed air forces the mixture out of the tank through the flow line 401 to the boom 50 if the valve 45 is open.

Similar to the arrangement for supplying compressed air into the mixing tank is the arrangement for furnishing compressed air into the diluent mearsuring tank 30. The compressed air from the storage tank 11 travels through an air line 300 to the top of the hollow cylinder 31 through an opening in the top plate 61. The air pressure in the line 300 is regulated by regulator 15 and is measured by air pressure gauge 16. A second valve 15' such as a vented ball valve, is mounted on the top plate 61 and is incorporated into air line 300. This valve 15' controls the actual flow of pressurized air into the hollow cylinder.

When the cylinder 31 has been filled with the appropriate amount of diluent through flow line 201, the piston 32 is urged against the adjustment rod 35. By allowing compressed air to enter the hollow cylinder 31 above the piston by opening valve 15', the piston 32 is forced downward and the diluent forced out of the cylinder 31 through outlet 36" of the T-connection. The check valve 37 prevents the diluent from flowing back toward the diluent storage tank.

After the mixture is emptied from the diluent mixing tank 40 through the boom 50, the mixing tank can be flushed with the diluent to remove any remaining traces of the spent mixture. A second fluid line 202 connects the storage tank 20 and the cylindrical mixing chamber 41. A third valve 28, such as a ball valve, is fitted into line 202 and is mounted on the top plate 61 for controlling the direct flow of diluent liquid into the chamber 41. The flushing diluent is emptied from the tank in the same manner as the mixture, that is through the boom 50 under pressure.

The operational procedure for using this apparatus is as follows.

First, the bleed valve 22(b) into the diluent storage tank 20 is opened, the diluent storage tank 20 is filled with diluent, usually water, from a diluent supply through a filler/drain 27, and the compressor 10 is engaged and the air storage tank 11 charged to 90–110 psi (6.3 kg/cm$^2$–7.7 kg/cm$^2$) on the pressure gauge 12. When the charge is built up, the tank filled, and valve 22(b) closed, valve 22(a) is opened and the regulator 13 is adjusted to charge the diluent tank 20 with 60 psi (4.2 kg/cm$^2$) pressure. A pressure reading is taken on the pressure gauge 14 in the air line 200.

Regulator 24 in the diluent line 201 is adjusted to produce a pressure in the line of 3–4 psi (0.21 kg/cm$^2$–0.28 kg/cm$^2$) (gauge 25). Also, the regulators 15 and 17 in the air lines 300 and 400 are adjusted. Regulator 15 in line 300 is set to 30 psi (2.1 kg/cm$^2$) (gauge 16) and regulator 17 in line 400 to mixing tank 40 is set at what will be the desired spraying pressure. The pressure in air line 400 is checked on gauge 18.

When all of the regulators have been properly adjusted, the adjustment rod 35 is positioned at a proper height in the cylinder 30 corresponding to the desired volume of diluent to be used and collected in the bottom of the cylinder beneath the piston 32. If the adjustment rod is threaded, it, of course, is rotated to an appropriate position. The diluent fluid then flows through the diluent line 201 to fill the measuring tank to the desired volume by pushing the piston 32 upward until the piston contacts the bottom of the adjustment rod 35.

After the diluent under relatively low pressure (3–4 psi/0.21–0.28 kg/cm$^2$) fills the required volume in the measuring tank 30, valve 15' is opened and compressed air at 30 psi pressure is introduced into the cylinder 31 above the piston 32 through air line 300. This pressure forces the piston downward and thus forces the diluent out the opening 36" through the check valve 38 into the diluent line 301 toward the diluent mixing tank 40. Valve 15' is closed after all of the diluent is removed from the cylinder. Since the cylinder is transparent, this can be determined visually.

The check valve 37 prevents the diluent from flowing back toward the storage tank when the pressure is introduced at the top of the cylinder. Also, the check valve 38 is designed to open only under pressures higher than the incoming pressure (3–4 psi/0.21–0.28 kg/cm$^2$) of the diluent into the diluent measuring tank. This prevents the diluent from filling the cylinder and then passing onward to the mixing tank before valve 15' is opened to introduce the higher pressure (30 psi) air into the measuring tank 30. Both check valves 37, 38 prevent backflow of the diluent therethrough.

With the diluent in the mixing tank 40, the lid 42 to the chamber 41 is opened and the test concentrate sample is added to the chamber through the lid opening. Once the mixture of concentrate and diluent is created, the lid 42 is closed. It is possible to add the concentrate during the transfer of the diluent to encourage thorough mixing, but in any event, after the mixture is completely formed, both the lid 42 and the valve 15' should be closed.

After the mixture is prepared in the mixing tank it is ready to be sprayed. Valve 17' is opened to permit the air under spray pressure to enter into the mixing tank through the crosspiece 43 at the inlet 43". Because of the pressure created within the mixing tank by the compressed air, by simply opening the valve 45 in line 401, the mixture will pass, under pressure, through line 401 to the boom 50 from which it is dispersed through nozzles. The valve 45 is closed when the spraying is completed, i.e. when no further liquid sprays from the boom.

Following completion of the spraying of the mixture and the closing of valve 45, valve 28 is opened in order to fill the mixing tank 40 with diluent from the diluent storage tank passing through diluent line 202 in order to clean or rinse out the mixing tank. While the diluent rinses into the tank, the valve 45 is again opened to disperse the rinse diluent from the tank 40 and at the same time rinse the boom. When rinsing is completed the valve 28 is closed to stop the flow of pressurized air into the tank, and finally valve 45 is closed after all the remaining pressure is released from the mixing tank. The apparatus is ready for preparing another dilution of concentrated sample by following the same steps outlined above.

Following completion of the spraying of the last sample and rinsing of the mixing tank, the apparatus is shut down by releasing all of the regulators, draining the diluent storage tank through the filler/drain valve 27 and storing until needed again.

What is claimed is:

1. An apparatus for preparing a mixture of a sample and a diluent and for dispersing said mixture, said apparatus comprising:

a source of compressed gas;

storage tank means for containing therein a supply of diluent;

measuring tank means for receiving therein a measured volume of said diluent from said storage tank means;

first diluent flow line means, extending from said storage tank means to said measuring tank means, for carrying said diluent from said storage tank means to said measuring tank means;

mixing tank means, connected to said measuring tank means, for receiving said measured volume of diluent from said measuring tank means and for mixing said measured volume with a sample, to thereby form a mixture;

dispersing means connected to said mixing tank means for dispersing therefrom said mixture;

second diluent flow line means, extending from said storage tank means to said mixing tank means, for supplying diluent to said mixing tank means to flush said mixing tank means after discharge of said mixture therefrom through said dispersing means;

a first compressed gas line connecting said source of compressed gas to said storage tank means;

a second compressed gas line connecting said source of compressed gas to said measuring tank means;

a third compressed gas line connecting said source of compressed gas to said mixing tank means;

first control means for starting gas flow through said first compressed gas line into said storage tank means to force diluent from said storage tank means through said first diluent flow line means into said measuring tank means until said measured volume of dilient is received therein, and for then stopping said flow;

second control means for starting gas flow through said second compressed gas line into said measuring tank means to force said measured volume of diluent from said measuring tank means into said mixing tank means, and for then stopping said flow;

third control means for starting gas flow through said third compressed gas line into said mixing tank means to force said mixture from said mixing tank means outwardly through said dispersing means, and for then stopping said flow; and fourth control means for starting gas flow through said first compressed gas line into said storage tank means to force diluent from said storage tank means through said second diluent flow line means into said mixing tank means and then outwardly through said dispersing means, for thereby flushing said mixing tank means, and for then stopping said flow.

2. An apparatus as claimed in claim 1, wherein said storage tank means comprises a storage tank containing said supply of diluent, said storage tank having filler/drain opening means through which said diluent is admitted into and drained from said tank, and gas inlet/outlet means in communication with the atmosphere and connected to said source of compressed gas through said first compressed gas line, outlet valve means at said gas inlet/outlet means to said storage tank for controlling the release of compressed gas from said storage tank into the atmosphere; said first control means includes regulator and gauge means in said first diluent flow line for regulating and measuring the flow of diluent in said first diluent flow line means; and said fourth control means includes control valve means in said second diluent flow line for stopping and starting the flow of diluent between said storage tank and said mixing tank means.

3. An apparatus as claimed in claim 1, wherein said measuring tank means comprises a transparent, hollow measuring cylinder, a top plate covering the top of said cylinder, said top plate having therein an opening through which extends said second compressed gas line, a bottom plate covering the bottom of said cylinder and having an opening therethrough, a floating piston sealed within said cylinder and movable up and down therein, adjustment means in said cylinder for limiting the upward movement of said piston within said cylinder, a measured diluent flow line having a first end connected to said mixing tank means, a hollow T-connection having first, second, and third sides, said first side connected to said first diluent flow line means, said second side connected to said opening in said bottom plate, and said third side connected to said measured diluent flow line at a second end thereof opposite from said first end connected to said mixing tank means, first check valve means in said first side of said T-connection for preventing diluent from flowing backward from said measuring tank means through said first diluent flow line means, and second check valve means in said third side of said T-connection for preventing diluent from said storage tank means from flowing through said measured diluent flow line before entering said hollow cylinder and for preventing diluent in said measured diluent flow line from flowing backward toward said cylinder.

4. An apparatus as claimed in claim 3, wherein said adjustment means comprises a threaded T-rod threaded through said top plate and extending into said hollow cylinder, said T-rod being adjustable upwardly and downwardly.

5. An apparatus as claimed in claim 3, wherein said transparent hollow measuring cylinder is transparent plastic.

6. An apparatus as claimed in claim 3, further comprising a plurality of threaded rods outside of said cylinder connecting said top plate and said bottom plate.

7. An apparatus as claimed in claim 1, wherein said mixing tank means comprises a hollow mixing tank having an open top and a bottom with an opening therethrough, a top plate covering said open top of said mixing tank, said top plate having an opening therethrough into said mixing tank, lid means mounted on said top plate at said opening therein for opening and closing said opening, a crosspiece connected to said opening in said bottom of said mixing tank, said crosspiece having a first side connected to said measuring tank means, a second side connected to said opening in the bottom of said mixing tank, a third side connected to said third compressed gas line, and a fourth side connected to said dispersing means.

8. An apparatus as claimed in claim 7, wherein said mixing tank is a stainless steel cylindrical tank having a conical-shaped lower portion.

9. An apparatus as claimed in claim 1, wherein said dispersing means comprises a dispersing boom, a mixture flow line connected between said boom and said mixing tank means, and valve means in said mixture flow line for controlling the flow of said mixture from said mixing tank toward said dispersing boom.

10. An apparatus as claimed in claim 9, wherein said valve means comprises a foot-operated valve.

* * * * *